Figure 1:
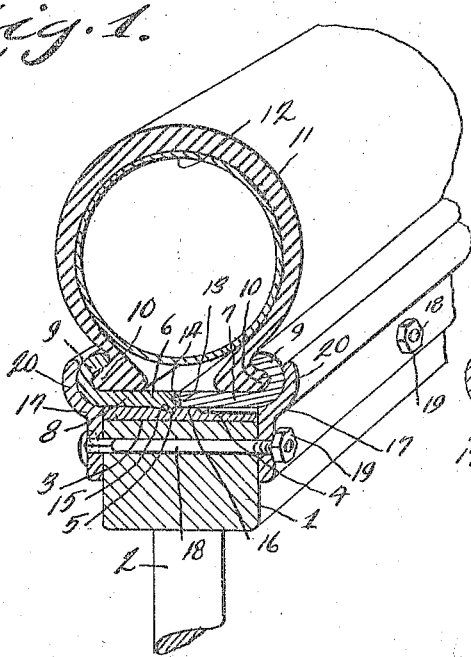

E. W. BRYAN.
WHEEL RIM FOR PNEUMATIC TIRES.
APPLICATION FILED AUG. 28, 1917.

1,286,524. Patented Dec. 3, 1918.

Witnesses
Philip Sewell
Francis L. Bowell

Inventor
E. W. Bryan
By D. Swift & Co.
his Attorneys

UNITED STATES PATENT OFFICE.

ENOCH WILLIAM BRYAN, OF VALDOSTA, GEORGIA.

WHEEL-RIM FOR PNEUMATIC TIRES.

1,286,524.      Specification of Letters Patent.      Patented Dec. 3, 1918.

Application filed August 28, 1917. Serial No. 188,675.

*To all whom it may concern:*

Be it known that I, ENOCH WILLIAM BRYAN, a citizen of the United States, residing at Valdosta, in the county of Lowndes, State of Georgia, have invented a new and useful Wheel-Rim for Pneumatic Tires; and I do hereby declare the following to be a full, clear, and exact description of the invention, such as will enable others skilled in the art to which it appertains to make and use the same.

This invention relates to an improved wheel-rim for pneumatic tires, and one of the objects of the invention is the provision of a wheel-rim particularly designed for automobile wheels.

A further object of the invention is the provision of a rim to be mounted on a felly of a wheel. This rim is simple, efficient, practical and durable, and consists of few parts, and constructed whereby it may be easily disassembled or assembled conveniently and with ease.

A further object of the invention, is the provision of a rim consisting of a pair of annular sections having clencher flanges to engage the flanges of the outer tire case, and having inter-engaging means at their meeting edges, whereby said sections may be held in place, in combination with a band between said sectional rim, and the conventional form of felly, there being annular rings bolted to the felly to hold the sectional rim in place.

A further object of the invention is to provide an annular wear band between the felly of the wheel and the tire holding rim, thereby avoiding wear on the wood felly incident to removing the tire holding rim.

A further object of the invention is the provision of an improved tire holding rim consisting of two sections joined as hereinafter specified, whereby either one of the sections may be easily renewed. For instance, it has been found that automobiles have been run for considerable distance on deflated tires, consequently there is considerable wear on the clencher flanges of the rim, sometimes there is more wear on one clencher flange than on the other, and heretofore the entire rim has been removed to be replaced by another, hence it is the aim of the present invention to provide a rim consisting of two sections, whereby one or the other of the sections may be removed to be replaced by a new section.

In practical fields the details of construction may necessitate alterations falling within the scope of what is claimed.

The invention comprises further features and combination of parts, as hereinafter set forth, shown in the drawings and claimed.

Figure 1 is a view in perspective of a felly showing the improved sectional rim, band and annular rings applied, and constructed in accordance with the invention.

Figure 2:
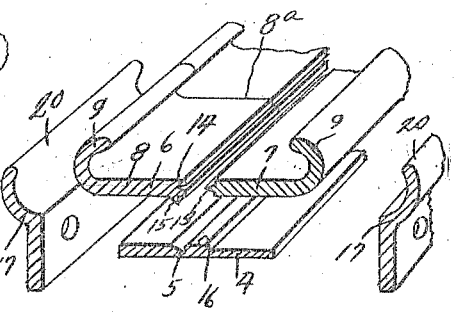

Fig. 2 discloses perspective views of the various parts of the rim construction.

Figure 3:
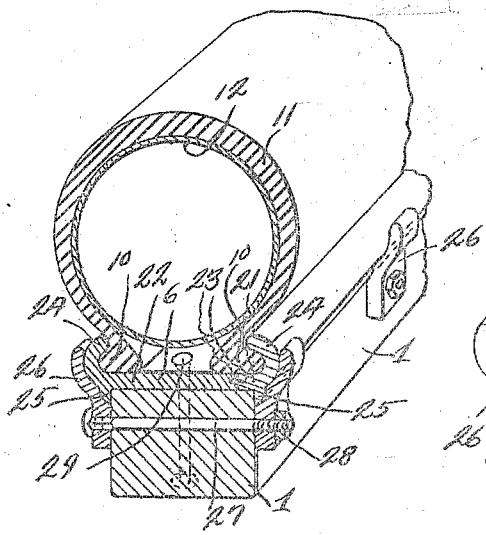

Fig. 3 is a perspective view of a modified form of rim construction on a felly.

Figure 4:
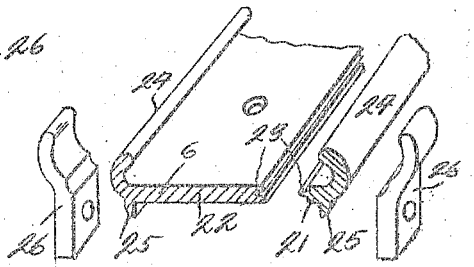

Fig. 4 discloses perspective views of the parts of the construction shown in Fig. 3.

Referring more especially to the drawings, 1 designates a usual felly, to which the spokes 2 are connected. Surrounding the felly 1 is an annular band 3, the upper face of which adjacent one edge has an annular cutaway portion 4. The band 3 is provided with an annular recess or groove 5 substantially V-shaped in cross section, and 6 denotes a rim, which consists of the two sections 7 and 8. The section 8 of the rim 6 is designed to be split as shown at 8ª in Fig. 2, so that the section 8 of said rim 6 may be mounted on or slipped over the band 3. These sections are provided with clencher flanges 9, to engage the flanges 10 of the outer tire casing 11, which surrounds the inner tube 12. The inner edge of the section 7 has a V-shaped annular tongue 13, to enter the annular V-shaped groove 14 of the inner edge of the section 8, whereby the inner edge portions of the sections 7 and 8 are held in place. The section 8 on its under face near its inner edge has a tongue 15 substantially V-shaped in cross section to engage the recess or groove 5. By splitting the section 8 of the band 6, the tongue 15 may engage the groove 5 of the band 3. When the section 7 of the rim 6 is slipped or fitted over the band 3, and the two sections 7 and 8 of the rim 6 clamped in place by the hereinafter set forth annular rings 17, said V-shaped annular tongue 13 will engage the correspondingly shaped groove 14, and prevent the adjoining end of the section 8 of the rim 6 from springing out of place. It will be seen that a raised portion 16 is formed between the cutaway part 4 and the recess or groove 5. The cutaway portion 4 is designed for the purpose of permitting the section 8 to be telescoped over the band 3, and by reason of the beveled surface of the tongue 15, the section 8 may be forced over the raised part 16 of the band 3. After the band 3 and the rim 6 are placed on the felly 1, the annular rings 17 are secured to the felly 1, by the bolts 18 having nuts 19, whereby the clencher flanges 20 of said rings will engage and support the clencher flanges 9. In Figs. 3 and 4, the rim 6 also consists of two sections 21 and 22, which have their tongue in grooved connected adjacent edges 23 to one side of the center of the felly 1. In Figs. 3 and 4 the band 3 is eliminated, and the sections 21 and 22 of the rim 6 have clencher flanges 24 to engage the flanges 10 of said tire casing 11. The sections 21 and 22 are provided with additional annular flanges 25 to engage the opposite sides of the felly 1. Clamping plates 26 are used in lieu of the rings 17, and are secured by the bolts 27 and nuts 28 to the felly 1. The section 22 of the rim 6 is secured by bolts, such as indicated at 29 to said felly 1.

The invention having been set forth, what is claimed as new and useful is:—

In an improved rim construction, a felly, an annular band surrounding the same, a rim surrounding the band, said rim consisting of two annular sections, the outer portions having clencher flanges to be engaged by flanges of the outer case of the tire, the inner adjacent edges of said sections having a tongue and groove connection, said band having its upper face near one edge provided with a cutaway portion extending annularly and provided with a central annularly extending groove V-shaped in cross section, said band having a raised portion between the cutaway portion and the groove of the band, one of said sections having an annularly extending tongue V-shaped in cross section adapted to be forced over the raised portion to engage the groove of the band, and a pair of annular rings secured to the opposite side faces of the felly to hold the sectional rim in place.

In testimony whereof I have signed my name to this specification in the presence of two subscribing witnesses.

ENOCH WILLIAM BRYAN.

Witnesses:
W. E. ALGEE,
W. D. PEEPLES, Jr.